United States Patent [19]

Moriyama

[11] Patent Number: 4,956,732
[45] Date of Patent: Sep. 11, 1990

[54] DEVICE FOR CONTINUOUSLY DRIVING A TAPE REEL SUPPORT AS A TAPE IS UNLOADED

[75] Inventor: Masahiro Moriyama, Daito, Japan

[73] Assignee: Sanyo Electric Co., Ltd., Moriguchi, Japan

[21] Appl. No.: 310,975

[22] Filed: Feb. 17, 1989

[30] Foreign Application Priority Data

Feb. 19, 1988 [JP] Japan ................................ 63-38288

[51] Int. Cl.⁵ ...................... G11B 15/32; G11B 15/44
[52] U.S. Cl. ...................... 360/96.3; 360/95;
360/96.1; 360/96.4; 360/85; 242/200
[58] Field of Search ............... 360/96.3, 96.4, 96.1,
360/95, 85; 242/200, 201

[56] References Cited

U.S. PATENT DOCUMENTS

| | | | |
|---|---|---|---|
| 4,635,146 | 1/1987 | Koda et al. | 360/96.3 |
| 4,698,706 | 10/1987 | Kilstofte | 360/96.1 |
| 4,723,184 | 2/1988 | Takai et al. | 360/96.3 |
| 4,819,891 | 4/1989 | Kanjo | 360/96.4 |

FOREIGN PATENT DOCUMENTS 59-171070 9/1984 Japan .
60-163264 8/1985 Japan .
61-296557 12/1986 Japan .

Primary Examiner—Stuart N. Hecker
Assistant Examiner—Alfonso Garcia
Attorney, Agent, or Firm—Armstrong, Nikaido, Marmelstein, Kubovcik & Murray

[57] ABSTRACT

In a signal recording-reproduction apparatus having a reel chassis slidably mounted on a main chassis, a reel support drive device transmits the rotation of a capstan motor serving as a power source to one of two reel supports through a swing idler mechanism on the main chassis and through a gear mechanism on the reel chassis. The gear mechanism includes at least two gears rotatable in the same direction and arranged along the sliding direction of the reel chassis. As the reel chassis slides along away from the head cylinder of the apparatus, an idle gear comes into meshing engagement with each of the two gears one after another to continue the rotation of the above reel support, whereby the magnetic tape pulled out around the head cylinder is wound up inside the tape cassette during the sliding movement of the reel chassis.

6 Claims, 10 Drawing Sheets

DEVICE FOR CONTINUOUSLY DRIVING A TAPE REEL SUPPORT AS A TAPE IS UNLOADED

FIELD OF THE INVENTION

The present invention relates to apparatus for recording and reproducing signals, such as 8-mm video tape recorders (VTRs) and digital audio tape recorders (DATs), and more particularly to a device for drivingly rotating a pair of reel supports by a capstan motor as the drive source.

BACKGROUND OF THE INVENTION

Signal recording-reproduction apparatus are known which have a smaller depthwise length when in a play mode wherein signals can be recorded or reproduced than when in an eject mode wherein a tape cassette is to be removed from the apparatus as disclosed, for example, in Examined Japanese Patent Publications SHO 59-171070, SHO 60-163264 and SHO 61-296557.

FIGS. 14 and 15 show such an apparatus which comprises a main chassis 1 having a head cylinder 11, and a reel chassis 2 provided with a supply reel support 22 and a take-up reel support 21 and slidably mounted on the main chassis 1 for movement toward or away from the head cylinder 11.

FIG. 14 shows the apparatus in the eject mode, in which the reel chassis 2 is at rest at a first stop position $S_1$, as projecting from the main chassis 1.

In response to a cassette loading start signal, a cassette loading mechanism (not shown) operates to advance the reel chassis 2 toward the head cylinder 11 to a second stop position $S_2$ shown in FIG. 15, whereupon the reel chassis 2 is halted. At this position, the apparatus is set in the play mode.

Concurrently with the operation of the loading mechanism, tape leading guides on a known tape loading mechanism advance from the tape cassette side toward the head cylinder, whereby the magnetic tape is withdrawn from the cassette and wound around the head cylinder 11 over a predetermined angle around the center thereof.

With the above apparatus, a known swing idler mechanism 3 having an idle gear 32 swings upon a changeover between a usual reproduction mode and a rewinding reproduction mode, coupling the idle gear 32 selectively to one of the take-up reel support 21 and the supply reel support 22 to drive the selected reel support in the tape winding direction.

The idle gear 32 of the swing idler mechanism 3 is coupled to a capstan motor 12 on the main chassis 1 and is reversibly rotated by the motor.

With the above signal recording-reproduction apparatus, the cassette is unloaded by the movement of the reel chassis 2 from the second stop position $S_2$ to the first stop position $S_1$. Concurrently with this movement, the tape is unloaded by the retraction of the tape leading guides in a direction away from the head cylinder 11. Accordingly, there arises a need to drive one of the reel supports in the tape winding direction during the cassette unloading movement so as to wind up the tape, pulled out around the head cylinder, inside the cassette.

However, in the case of the above apparatus wherein the reel chassis 2 is slidable relative to the main chassis 1 as stated, the distance between the capstan motor 12 for driving the reel supports 21, 22 and these reel supports changes during the cassette unloading operation since the motor 12 is mounted on the main chassis 1 and the reel supports 21, 22 are mounted on the reel chassis 2.

For this reason, therefore, the idle gear 32 of the swing idler mechanism 3 needs to have a sufficiently large diameter in accordance with the amount of movement of the reel chassis so as to be operatively connectable to one of the reel supports at all times regardless of the position of the reel chassis. This makes the apparatus very large.

Unexamined Japanese Patent Publication SHO 60-163264 proposes a device wherein the reel support is driven by a pulley mechanism in place of the swing idler mechanism so that the support can be driven during the movement of the reel chassis. The proposed device nevertheless has the problem of being complex in construction, for example, because means are necessary for holding the belt under a specified tension.

SUMMARY OF THE INVENTION

An object of the present invention is to provide a reel support drive device having a simple construction and adapted to transmit the rotation of the capstan motor on the main chassis to a reel support during the tape take-up on the reel chassis at all times even when the reel chassis is in sliding movement.

Another object of the invention is to provide a reel support drive device which comprises a gear mechanism compactly arranged in a flat space between the main chassis and the reel chassis for transmitting the rotation of the capstan motor to both reel supports.

The device of the present invention for driving reel supports comprises a first gear mechanism mounted on a reel chassis and coupled to one of the reel supports, a second gear mechanism mounted on the reel chassis and coupled to the other reel support, and a swing idler mechanism mounted on a main chassis and pivotally movable in a plane in parallel to the reel chassis.

The swing idler mechanism comprises a lever swingable with a change in the direction of rotation of a capstan motor, a fixedly positioned gear supported concentrically with the center of rotation of the lever, and an idle gear rotatably supported by the free end of the lever and operatively connected to the fixedly positioned gear at all times. The idle gear is selectively meshable with one of the first and second gear mechanisms. The fixedly positioned gear is coupled to the capstan motor by rotation transmitting means. The first gear mechanism comprises at least three gears.

At least two gears included in the first gear mechanism and rotatable in the same direction are arranged along the sliding direction of the reel chassis in the vicinity of the idle gear so as to mesh one after another with the idle gear during their movement due to the sliding movement of the reel chassis. The other gear or gears included in the first gear mechanism are arranged away from the idle gear so as not to mesh therewith.

When signals are to be recorded or reproduced in the play mode, the lever of the idler mechanism is swung toward the tape take-up reel support by the rotation of the capstan motor. With the reel chassis positioned in proximity to the head cylinder at this time, the idle gear meshes with the gear of the first gear mechanism close to the reel support to rotate the support in the tape winding direction.

When the mode is changed to the eject mode, the tape unloading operation and cassette unloading operation are started almost at the same time.

The capstan motor rotates in the same direction when signals are recorded or reproduced, whereby the idler mechanism is swung toward the take-up reel support as in the above case. At this time, the reel chassis is sliding away from the head cylinder, with the result that the above-mentioned gear, close to the reel support, of the first gear mechanism moves out of meshing engagement with the idle gear, which in turn comes into meshing engagement with another gear of the first gear mechanism rotating in the same direction as the above gear and positioned close to the head cylinder.

The plurality of gears which mesh one after another with the idle gear rotate in the same direction, so that the reel support continues to rotate in the tape winding direction also during the movement of the reel chassis, whereby the magnetic tape pulled out around the head cylinder in the play mode is completely or almost completely wound up inside the cassette by the time the cassette unloading operation is completed.

With the reel support drive device of the present invention, the means for transmitting rotation from the idle gear to the reel support during the sliding movement of the reel chassis consists solely of a gear mechanism, which is therefore simpler in construction than a belt mechanism or the like conventionally used.

In the cassette unloading operation, the different gears included in the first gear mechanism mesh one after another with the idle gear for the idle gear to transmit its rotation to the reel support. Accordingly, the idle gear need not be made large even if the amount of movement of the reel chassis is great.

Furthermore, all the gears of the first and second gear mechanisms except for those directly meshing with the reel supports can be flat spur gears, which can be arranged in a plane between the main chassis and the reel chassis. This makes it possible to arrange the two chassis in closest proximity to each other and to thereby provide a signal recording-reproduction apparatus of reduced height or thickness.

DETAILED DESCRIPTION OF EMBODIMENTS

With reference to the drawings, an 8-mm VTR embodying the invention will be described in detail.

Construction of Chassis and Reel Chassis Drive System

Figure 6:
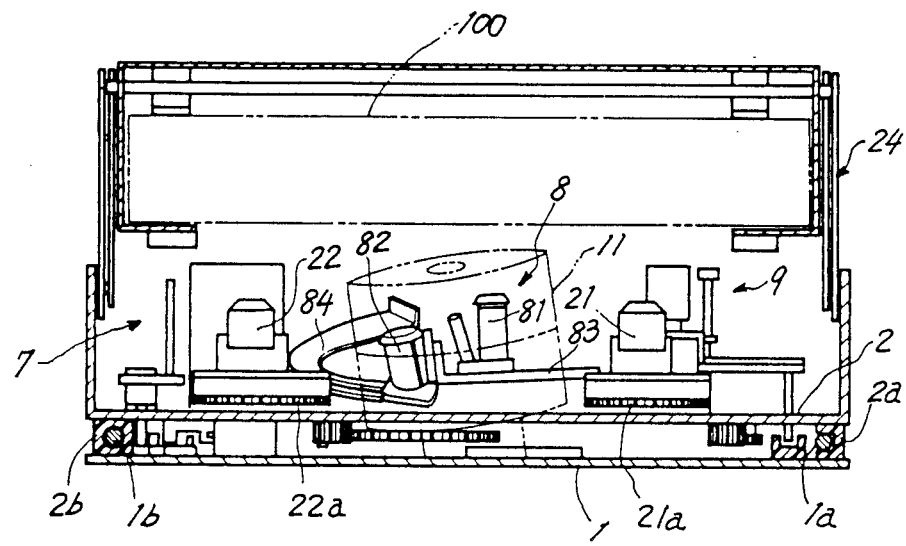
FIG. 6 is a view in vertical section of a recording-reproduction apparatus to show the main chassis and the reel chassis as engaged therewith.

FIG. 6 shows a main chassis 1 carrying a head cylinder 11, and a reel chassis 2 provided with a supply reel support 22 and a take-up reel support 21 and slidably mounted on the main chassis 1. The reel chassis 2 is so guided as to move straight properly by the engagement of guide shafts 1a, 1b arranged at opposite sides of the main chassis on the upper surface thereof with guide members 2a, 2b arranged at opposite sides of the reel chassis on the lower surface thereof.

A cassette holder 24 for holding a tape cassette is liftably supported by the reel chassis 2.

Figure 4:
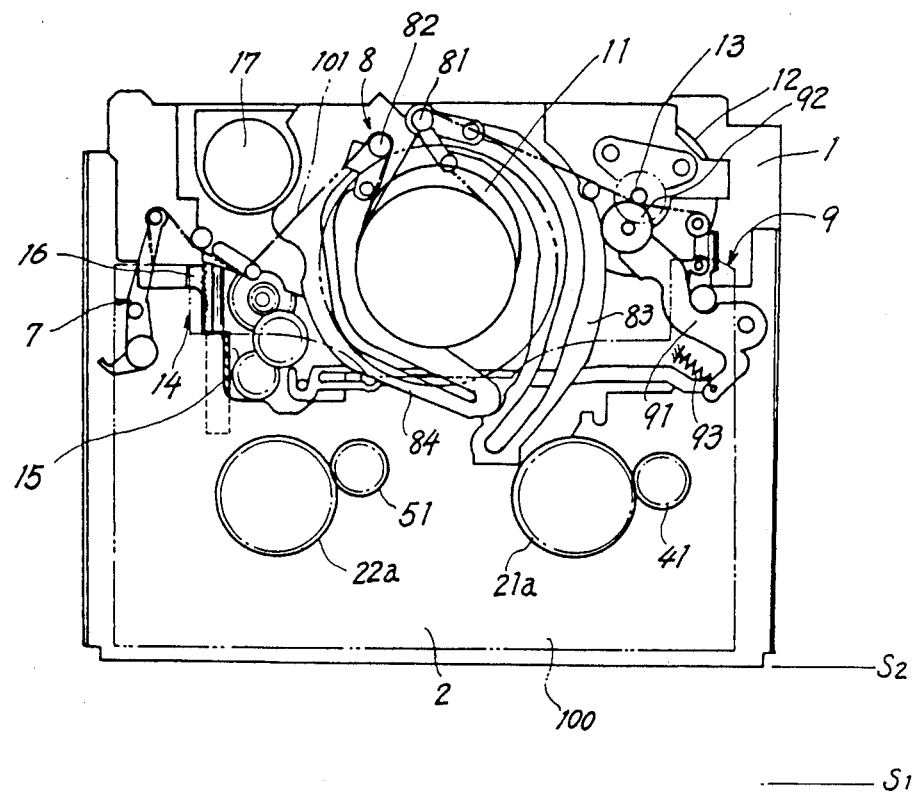
FIG. 4 is a plan view showing a tape loading mechanism and a tape travel system in the play mode.
Figure 5:
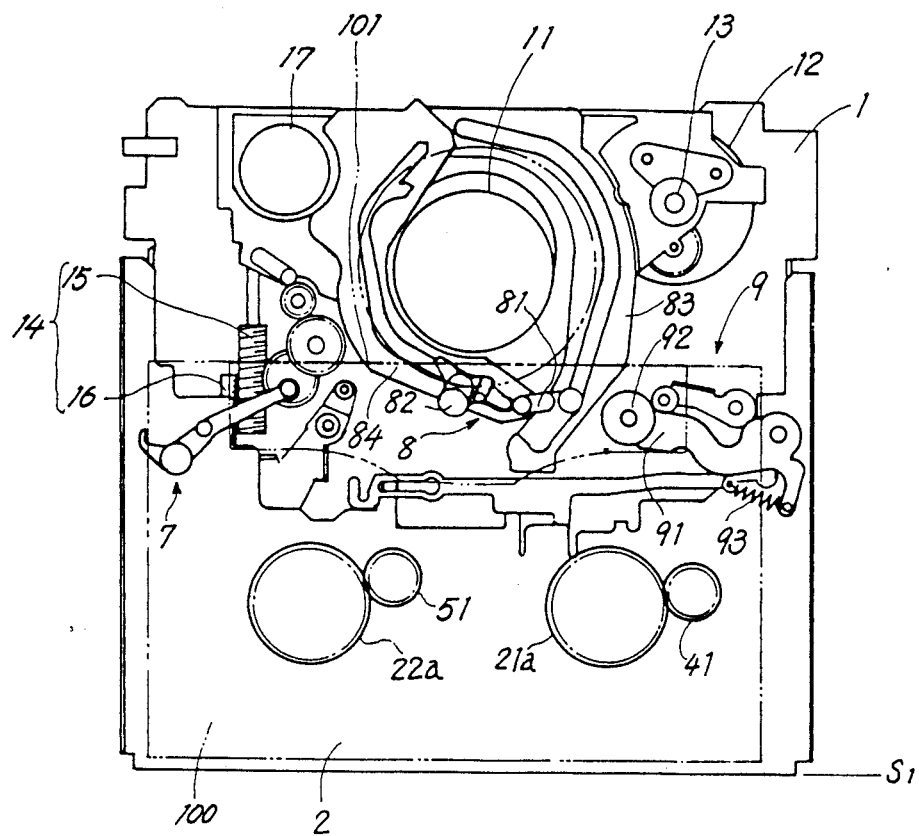
FIG. 5 is a plan view showing the tape loading mechanism in the eject mode.

As seen in FIGS. 4 and 5, arranged on the main chassis 1 at the left side of the head cylinder 11 are a loading motor 17 serving as a power source for a cassette loading operation and tape loading operation, and a worm 15 reversibly rotatable by the motor 17.

A reel chassis drive mechanism 14 comprises the worm 15 and a rack 16 fixed to the reel chassis 2 and meshing with the worm 15. The worm 15 is rotated forward or reversely according to the direction of rotation of the loading motor 17 to drive the reel chassis 2 toward or away from the head cylinder 11.

Tape Loading System

Provided on the main chassis 1 are a capstan motor 12 having a capstan 13 and disposed on the right side of the head cylinder 11, and a tape loading mechanism 8 disposed around the head cylinder 11 for withdrawing the magnetic tape from the cassette when loading the tape. As is already known, the tape loading mechanism 8 comprises a pair of circular-arc rails 83, arranged around the respective sides of the head cylinder 11, a pair of tape leading guides 81, 82 slidable on the respective rails, etc. The guides 81, are coupled to the loading motor 17 by an unillustrated power transmission.

Accordingly, the loading motor 17, when rotated, advances each of the tape guides 81, 82 from one end position of movement toward the tape cassette shown in FIG. 5 to the other end position toward the head cylinder shown in FIG. 4 to wind the tape 101 around the head cylinder 11.

On the other hand, a pinch roller lever mechanism 9 is mounted on the reel chassis 2 at the right side of the take-up reel support 21. As seen in FIG. 5, the lever mechanism 9 comprises a pinch roller lever 91 pivoted to the reel chassis 2 and biased clockwise by a spring 93, a pinch roller 92 mounted on the lever, and cam means (not shown) coupling the main chassis to the pinch roller lever. When the eject mode shown in FIG. 5 is changed over to the play mode of FIG. 4, the lever 91 moves clockwise, causing the pinch roller 92 to press the tape 101 against the capstan 13.

Figure 1:
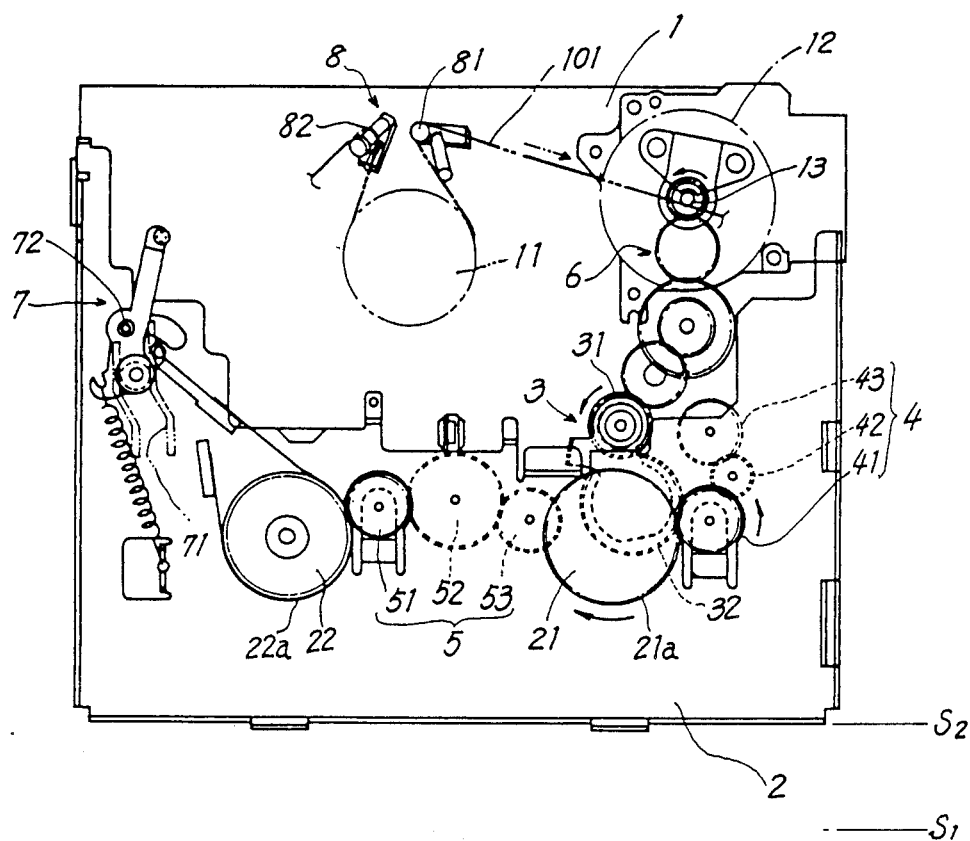
FIG. 1 is a plan view showing a main chassis and a reel chassis as positioned relative to each other, and a reel support drive device during usual signal reproduction in the play mode.
Figure 3:
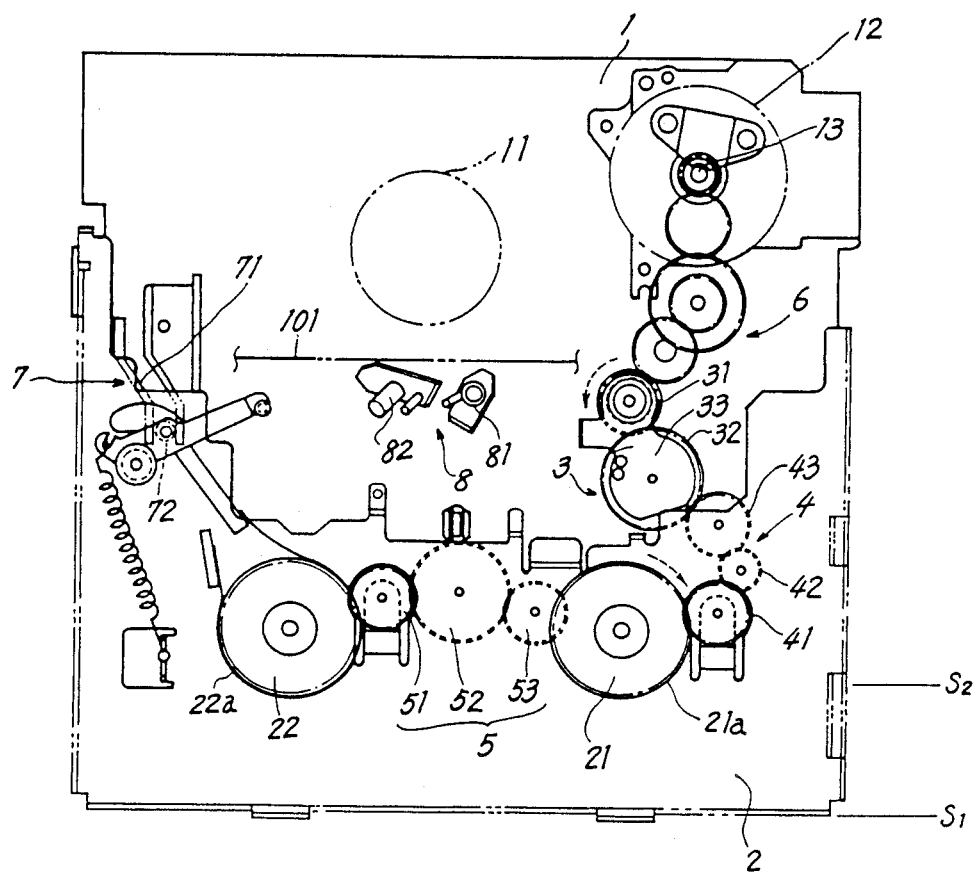
FIG. 3 is a plan view showing the same in the eject mode.

A tape drawing lever mechanism 7 is also provided on the reel chassis 2 on the left side of the supply reel support 22 as seen in FIGS. 1 and 3. This lever mechanism 7 has a cam follower 72 engaged in a cam groove 71 provided on the main chassis and moves with the sliding movement of the reel chassis 2. The mechanism 7 withdraws the tape from the cassette in the initial stage of tape loading, and suitably tensions the tape 101 in the play mode of FIG. 4.

Reel Support Drive System

Figure 2:
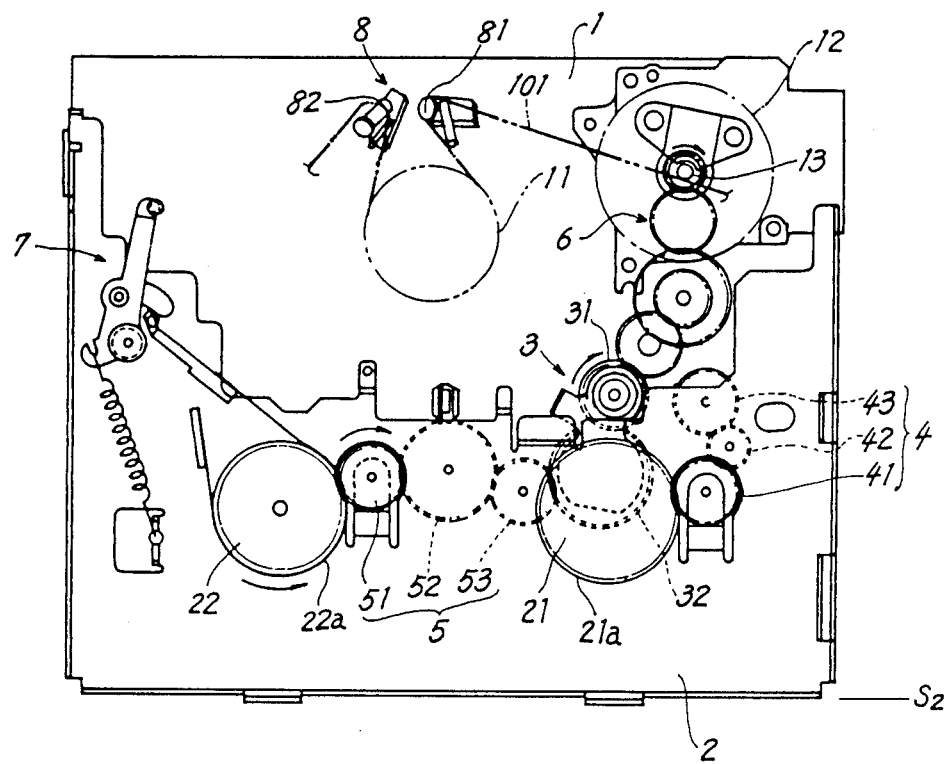
FIG. 2 is a plan view similar to FIG. 1 and showing the same during rewinding reproduction in the play mode.
Figure 7:
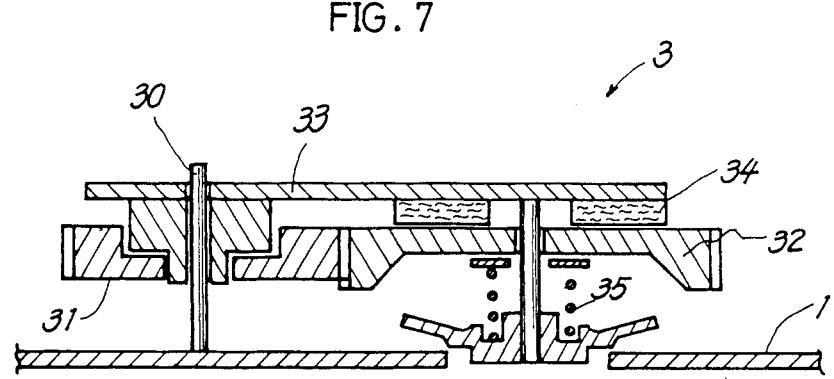
FIG. 7 is a view in vertical section of a swing idler mechanism.

With reference to FIGS. 1 to 3, a swing idler mechanism 3 is mounted on the main chassis 1 and disposed between the capstan motor 12 and the take-up reel support 21 on the reel chassis 3. The mechanism 3 is pivotally movable in a plane parallel to the main chassis 1. As seen in FIG. 7, the swing idler mechanism 3 comprises a swing lever 33 supported by a pivot 30 on the main chassis 1, a fixedly positioned gear 31 supported by the lever pivot 30 and rotatable relative to the pivot independently of the pivotal movement of the lever 33, an idle gear 32 mounted on the free end of the lever 33 rotatably and vertically movably and meshing with the gear 31 at all times, a felt member 34 interposed between the lever 33 and the idle gear 32 and secured to the lever, and a spring 35 for biasing the idle gear 32 into pressing contact with the felt member 34.

Accordingly, when the fixedly positioned gear 31 rotates in either direction, the idle gear 32 is thereby driven, while owing to the frictional contact of the idle gear 32 with the felt member 34, the torque of the fixedly positioned gear 31 is partly delivered to the lever 33, acting to rotate the lever 32 in the same direction as the rotation of the gear 31.

The same effect as above can be obtained also by providing the felt member 34 between the lever 33 and the fixedly positioned gear 31.

As seen in FIGS. 1 to 3, the fixedly positioned gear 31 is coupled to the capstan motor 12 by rotation transmitting means 6 comprising a train of gears and provided on the main chassis 1.

Further mounted on the reel chassis 2 are a first gear mechanism 4 at the right side of the take-up reel support 21 and a second gear mechanism 5 between the take-up reel support 21 and the supply reel support 22.

The gear mechanisms 4, 5 are meshable with the idle gear 32 to transmit the rotation of the gear 32 to the respective reel supports 21, 22. The first gear mechanism 4 comprises a first gear 41 meshing with a gear portion 21a of the take-up reel support 21, a second gear 42 positioned closer to the capstan motor 12 than the first gear 41 but away from the idler mechanism 3, and a third gear 43 positioned closer to the motor 12 than the second gear 42 and close to the idler mechanism 3. These three gears are each in the form of a spur gear.

The second gear mechanism 5 comprises a fourth gear 51 meshing with a gear portion 22a of the supply reel support 22, a fifth gear 52 positioned closer to the take-up reel support 21 than the fourth gear 51, and a sixth gear 53 positioned even further closer to the support 21 than the fifth gear 52. Each of these three gears is in the form of a spur gear.

Figure 12:
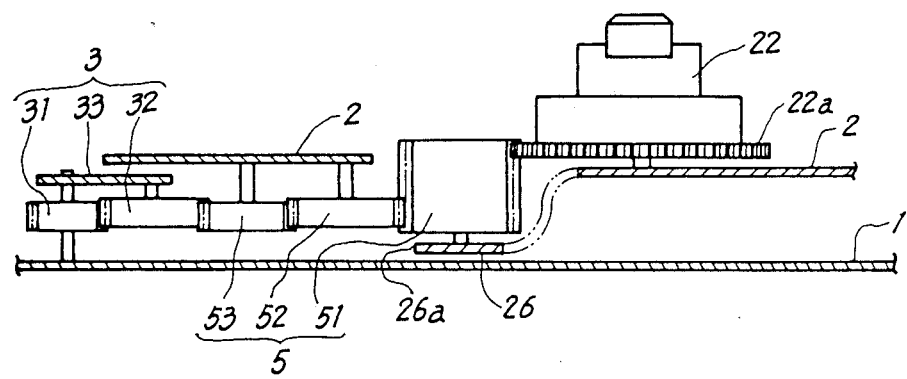
FIG. 12 is a sectional view of the same during rewinding reproduction.
Figure 13:
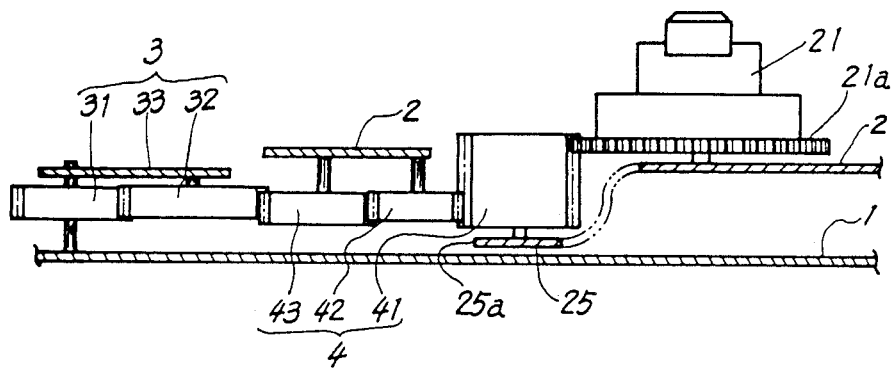
FIG. 13 is a sectional view of the same in the eject mode.

With reference to FIGS. 12 and 13, the second and third gears 42, 43 of the first gear mechanism 4 and the fifth and sixth gears 52, 53 of the second gear mechanism 5 are arranged underside the reel chassis 2. The first gear 41 of the mechanism 4 and the fourth gear 51 of the mechanism 5 have a larger thickness than the other gears and are supported on steps 25, 26, respectively, which are formed by locally lancing the reel chassis 2 toward the main chassis 1. Each of these thick gears has its lower half positioned below the reel chassis 2 and its upper half above the chassis 2. The lower half of the first gear 41 meshes with the second gear 42 at an opening 25a defined by the step 25, and the upper half thereof meshes with the gear portion 21a of the take-up reel support 21. The lower half of the fourth gear 51 is in mesh with the fifth gear 52 at an opening 26a defined by the step 26, and the upper half thereof is in mesh with the gear portion 22a of the supply reel support 22.

Operation in Play Mode

In the play mode shown in FIG. 1, the reel chassis 2 is at rest in the second stop position S2 close to the head cylinder 11. As a result, the first gear 41 of the first gear mechanism 4 and the sixth gear 53 of the second gear mechanism 5 are positioned at opposite sides of the idle gear 32 of the swing idler mechanism 3.

Figure 11:
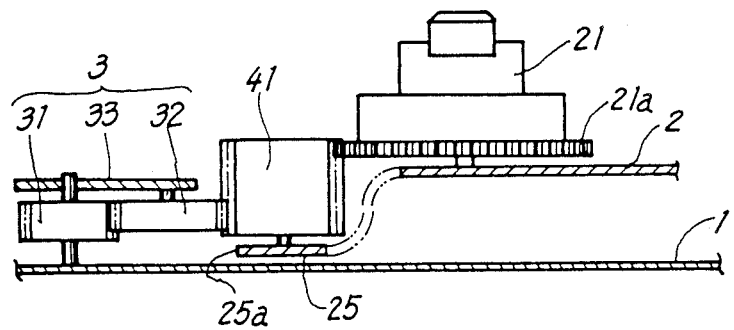
FIG. 11 is a view in vertical section taken along a route of transmission of rotation and showing means for transmitting rotation from the idler mechanism to the reel support during usual reproduction.

When signals are recorded or reproduced, the fixedly positioned gear 31 is driven counterclockwise by the capstan motor 12, thereby causing the lever 33 of the idler mechanism 3 to swing counterclockwise to mesh the idle gear 32 with the first gear 41 of the first gear mechanism 4 (see FIG. 11).

At this time, the idle gear 32 in mesh with the fixedly positioned gear 31 rotates clockwise to rotate the first gear 41 counterclockwise, with the result that the take-up reel support 21 meshing with the first gear 41 is driven clockwise to wind up the magnetic tape 101.

For rewinding reproduction, the capstan motor 12 reversely rotates to drive the fixedly positioned gear 31 clockwise, thereby swinging the lever 33 clockwise and meshing the idle gear 32 with the sixth gear 53 of the second gear mechanism 5 as seen in FIG. 2 (see also FIG. 12).

The idle gear 32, meshing with the gear 31 and rotating counterclockwise, causes the sixth, fifth and fourth gears 53, 52, 51 to drive the supply reel support 22 counterclockwise to rewind the tape 101.

Operation with Change from Play Mode to Eject Mode

When the play mode is changed to the eject mode, the loading motor 17 operates to start unloading the tape and the cassette almost at the same time.

The capstan motor 12 rotates in the same direction as when signals are recorded or reproduced, thereby swinging the idler mechanism 3 toward the take-up reel support 21.

Figure 8:
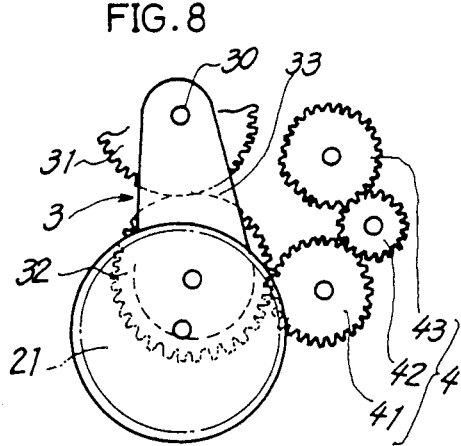
FIG. 8 is a plan view showing the idler mechanism and a first gear mechanism in the play mode.
Figure 9:
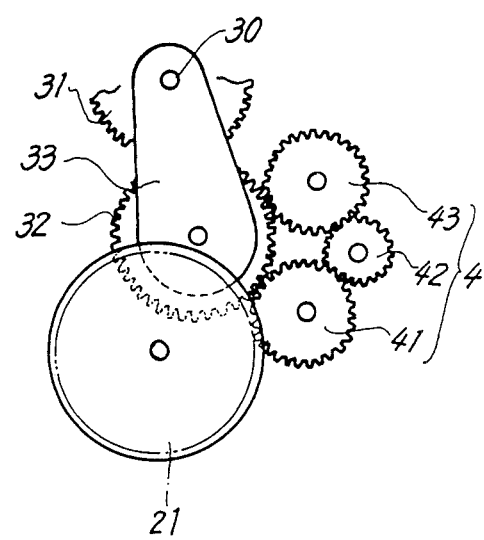
FIG. 9 is a plan view showing the same during a cassette unloading operation.

During the sliding movement of the reel chassis 2 from the second stop position $S_2$ of FIG. 1 to the first stop position S1 of FIG. 3 in a direction away from the head cylinder 11, the idle gear 32 in a first meshing state wherein it is in mesh only with the first gear 41, close to the take-up reel support 21, of the first gear mechanism 4 as seen in FIG. 8 moves out of this state into a second meshing state shown in FIG. 9 wherein the gear 32 is in mesh with both the first and third gears 41, 43 rotating in the same direction.

Because the idle gear 32 is out of meshing engagement with the second gear 42 at this time and further because the first and third gears 41, 43 are rotating in the same direction, the take-up reel support 21 continues rotating in the tape winding direction free of any trouble.

Figure 10:
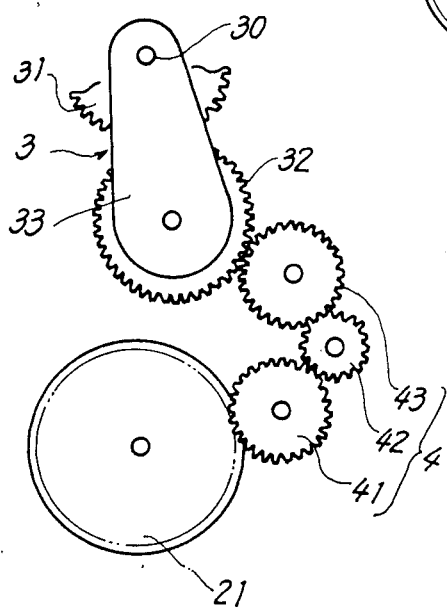
FIG. 10 is a plan view showing the same in the eject mode.

When the reel chassis 2 further slides along in the same direction, the idle gear 32 is released from the first gear 41 and only with the third gear 43 as shown in FIGS. 3 and 10. Thus, the gear 32 is brought into a third meshing state.

During the change from the first meshing state to the second meshing state and then to the third meshing state, the swing idler mechanism 3 is always given a counterclockwise torque by the counterclockwise rotation of the fixedly positioned gear 31, so that the idle gear 32 is held in meshing engagement with the first gear mechanism 4.

Upon the reel chassis 2 reaching the first stop position $S_1$ of FIG. 3, the loading motor and the capstan motor are deenergized, and the apparatus is set in the eject mode.

Consequently, the magnetic tape 101 withdrawn from the cassette in the play mode of FIG. 1 is wound up inside the cassette by the take-up reel support 21 by the time the eject mode of FIG. 3 is set.

With the reel support drive device described above, the take-up reel support 21 can be continuously rotated by the capstan motor 12 by a simple arrangement consisting only of trains of gears regardless of the position of the reel chassis 2 during the cassette unloading operation. The device is therefore simpler and more compact than the conventional reel drive device comprising a pulley mechanism.

Further as seen in FIGS. 1 to 3 and FIGS. 11 to 13, major portions of the gear mechanisms 4, 5 constituting the reel support drive device are arranged in a flat space between the main chassis 1 and the reel chassis 2. This arrangement is useful for providing VTRs of reduced thickness.

The drawings and the description of the embodiment are intended to illustrate the present invention and should not be construed as limiting or reduced the scope of the invention as defined in the appended claims.

The construction of the present invention is not limited to the foregoing embodiment but can be modified variously by one skilled in the art without departing from the spirit of the invention described in the claims.

For example, the number of gears of the first and second gear mechanisms 4,5 is not limited to three. It is possible to use five gears for the first gear mechanism 4 so that during the unloading operation the idle gear 32 comes into meshing engagement with at least three gears one after another which gears rotate in the same direction.

The second gear mechanism 5 needs only to be so adapted as to rotate the supply reel support 22 in the same direction as the rotation of the idle gear 32, so that one gear is also serviceable as the mechanism.

Figure 13A:
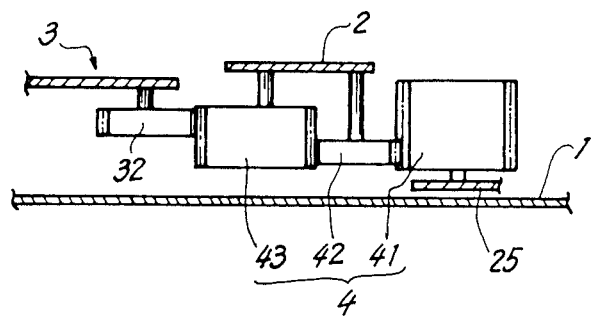
FIG. 13A is a sectional view corresponding to FIG. 13 and showing another example of rotation transmitting means.
Figure 14:
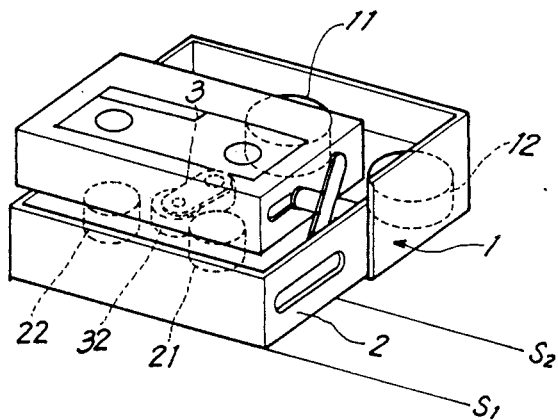
FIG. 14 is a perspective view of a conventional apparatus in the eject mode.
Figure 15:
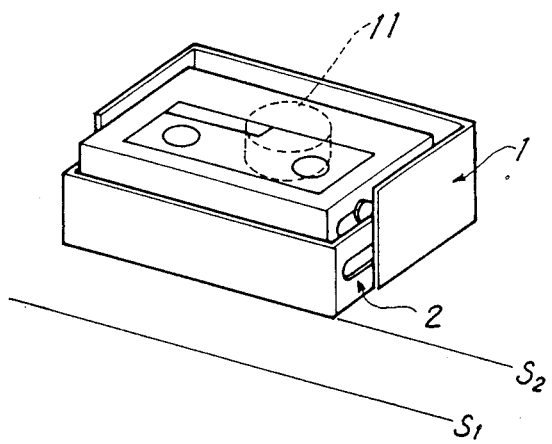
FIG. 15 is a perspective view of the same in the play mode.

It is also possible to align the first to third gears 41, 42, 43 of the first gear mechanism 4 along the direction of movement of the reel chassis. In this case, the third gear 43 is given a larger thickness than the second gear 42, with the second gear 42 positioned below the idle gear 32 as seen in FIG. 13A, whereby the idle gear 32 is out of engagement with the second gear 42. Further, the first gear mechanism 4 and the second gear mechanism 5 might be arranged in such a manner that the first gear mechanism 4 is engaged with the supply reel support 22 and the second gear mechanism 5 is engaged with the take-up reel support 21.

What is claimed is:

1. A reel support drive device including a main chassis provided with a head cylinder and a capstan motor, a reel chassis slidably mounted on the main chassis and provided with a pair of reel supports, the reel chassis being movable between an eject mode projected from the main chassis and a play mode positioned close to the head cylinder for loading a tape, and a swing idler mechanism provided on the main chassis and coupled to the capstan motor, the idler mechanism being selectively alternatively engageable with one of the two reel supports on the reel chassis to drivingly rotate the reel support, wherein the improvement comprises:
a gear mechanism mounted on the reel chassis and coupled to one of the reel supports,
the idler mechanism includes a lever supported by a pivot and swingable with a change in the direction of rotation of the capstan motor, a fixedly positioned gear supported concentrically with said pivot supporting the lever, and an idle gear supported on the free end of the lever and coupled to the fixedly positioned gear at all times,
the fixedly positioned gear being coupled to the capstan motor by rotation transmitting means, and
said gear mechanism includes at least three gears, at least two of the gears of the gear mechanism being rotatable in the same direction and arranged along the sliding direction of the reel chassis so as to mesh one after another with the idle gear during their movement during sliding movement of the reel chassis, the other at least one gear of the gear mechanism being so positioned as not to mesh with the idle gear, whereby the rotation of the capstan motor is transmitted to said one reel support during the sliding movement of the reel chassis.

2. A device as defined in claim 1 wherein the gears of the gear mechanism meshable with the idle gear are arranged close to the idle gear, and the gear not meshable with the idle gear is disposed in the same plane as the idle gear and positioned away from the idle gear.

3. A device as defined in claim 1 wherein the gear of the gear mechanism not meshable with the idle gear is positioned at a different level from the idle gear.

4. A device as defined in claim 1 wherein the gears of the gear mechanism meshable with the idle gear are so spaced apart from each other and positioned that the idle gear meshes with at least one of the gears at all times during their movement due to the sliding movement of the reel chassis, whereby the rotation of the capstan motor is continuously transmitted to said one reel support during the sliding movement of the reel chassis.

5. A device as defined in claim 1 wherein the gear mechanism comprises a first gear meshing with a gear portion of said one reel support as a take-up reel support and so positioned as to mesh with the idle gear, a second gear meshing with the first gear and so positioned as not to mesh with the idle gear, and a third gear meshing with the second gear and so positioned as to mesh with the idle gear, and while the reel chassis slidingly moves away from the head cylinder, the idle gear first meshes with the first gear only, then with both the first gear and the third gear and thereafter with the third gear only, the capstan motor rotates in a direction for the take-up reel support to wind up the tape.

6. A device as defined in claim 1 wherein said one reel support having the gear mechanism coupled thereto has a gear portion at the upper side of the reel chassis, all the gears of the gear mechanism are spur gears, one of the gears of the gear mechanism being directly in mesh with the gear portion of the reel support and projecting above and below the reel chassis, the other gears of the gear mechanism being arranged in a plane within a space between the main chassis and the reel chassis.

* * * * *